Nov. 18, 1969  G. N. BLOISE  3,479,050
WHEEL SUSPENSION AND STEERING MECHANISM
Filed April 24, 1967  4 Sheets-Sheet 2

INVENTOR.
GEORGE N. BLOISE
BY Jack M. Wiseman
ATTORNEY

INVENTOR.
GEORGE N. BLOISE
BY Jack M. Wiseman
ATTORNEY

United States Patent Office 3,479,050
Patented Nov. 18, 1969

---

3,479,050
WHEEL SUSPENSION AND STEERING MECHANISM
George N. Bloise, 3740 Elston Drive,
San Bruno, Calif. 94066
Filed Apr. 24, 1967, Ser. No. 640,768
Int. Cl. B62d 3/02
U.S. Cl. 280—95                              9 Claims

---

ABSTRACT OF THE DISCLOSURE

A wheel suspension and steering system in which pivot mounting bars are aligned parallel to the road and the wheels are joined by trailing links to transverse pivot mounts on these bars. Each mounting bar, in turn, is attached to the vehicle chassis by a longitudinal pivot mount. Thus, each wheel moves independently in a plane perpendicular to the road, and the chassis may lean or roll without affecting the camber of the wheels. The wheels are steered by a one-piece tie rod activated by the longitudinal movement of a two-piece pitman arm. The ends of the two pieces of the pitman arm are hinged or joined so that motion of the chassis or suspension system is taken up by rotation of the hinge, and thus such motion does not cause any steering feedback or deviation in the toe-in setting of the wheels.

---

The present invention relates to a wheel-suspension and steering system in which the wheel alignment and wheel camber is substantially unaffected by lean or roll of the vehicle chassis.

In order to utilize the full tread width of tires, it is necessary to constrain the motion of the wheels to a plane perpendicular to the wheel supporting surface. Present suspension and steering systems for accomplishing this are interleaved with the vehicle chassis in such a way that roll or lean in the chassis can adversely affect the wheel alignment and wheel camber. The present invention overcomes this disadvantage by providing structure in which the wheel suspension mechanism, the steering mechanism, and the vehicle chassis, all function independently.

One object of the present invention is the provision of a wheel suspension system which permits independent motion of each wheel in a plane perpendicular to the wheel supporting surface.

Another object of the present invention is the provision of a wheel suspension system in which lean or roll of the vehicle chassis does not affect the camber of the wheels.

Another object of the present invention is the provision of a wheel suspension and steering system in which the toe-in of the wheels does not change with motion of either the wheel suspension system or the vehicle chassis.

Still another object of the present invention is the provision of a wheel steering system which does not transmit feedback resistance.

The various features and advantages of the present invention will become apparent upon a consideration of the following description, taken in conjunction with the accompanying drawing, in which.

Figure 1:
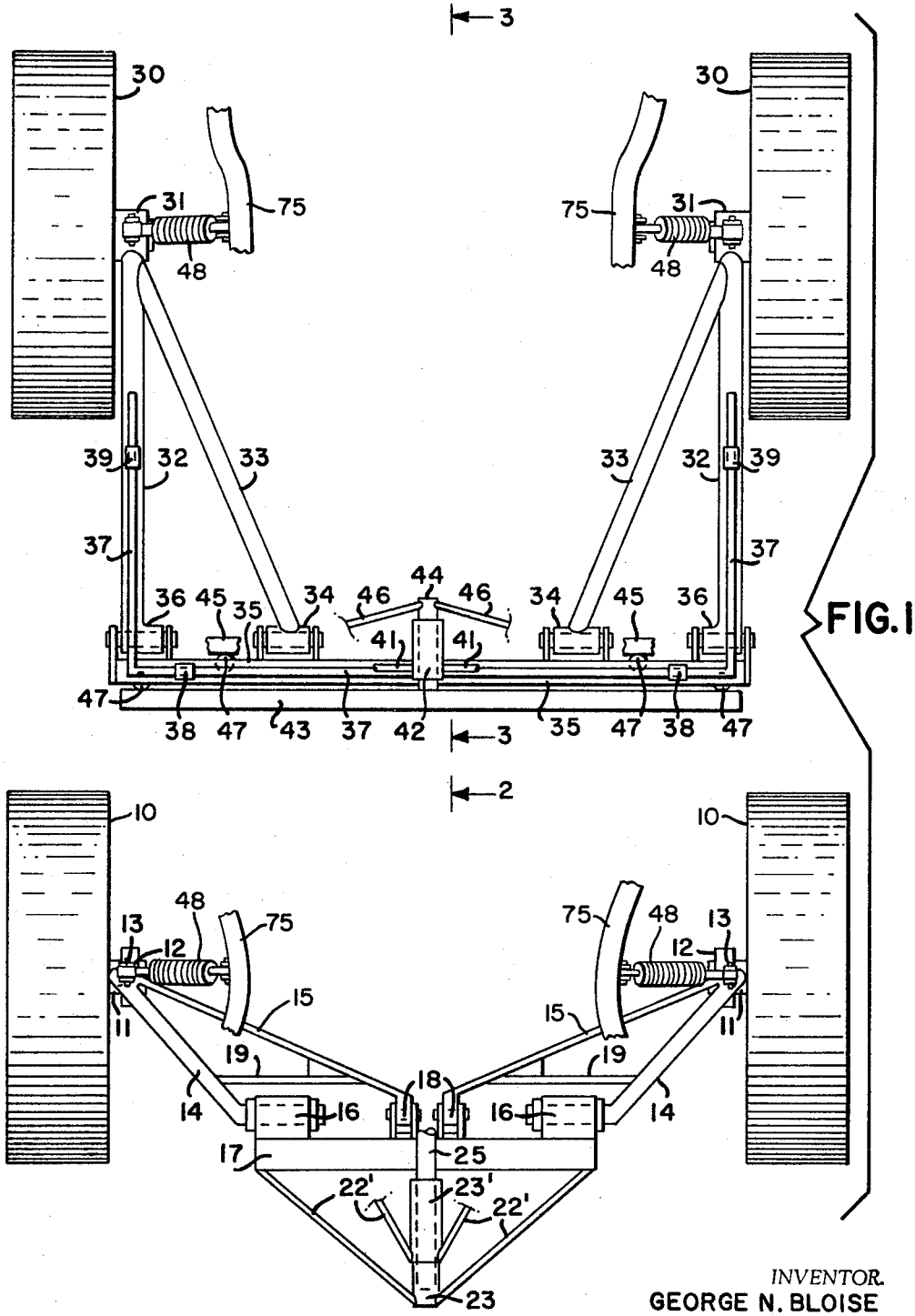
FIGURE 1 is a top plan view of a front and rear wheel suspension system embodying the present invention.
Figure 2:
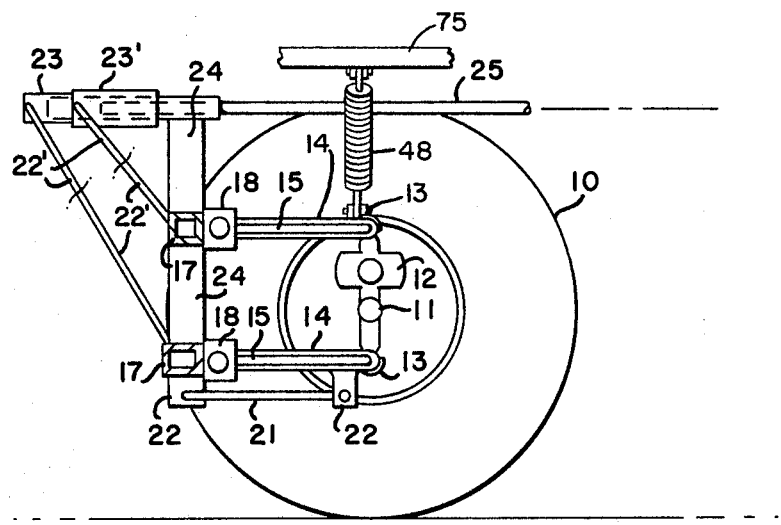
FIGURE 2 is a side elevational view of the front wheel suspension system taken along line 3—3 of FIGURE 1.
Figure 4:
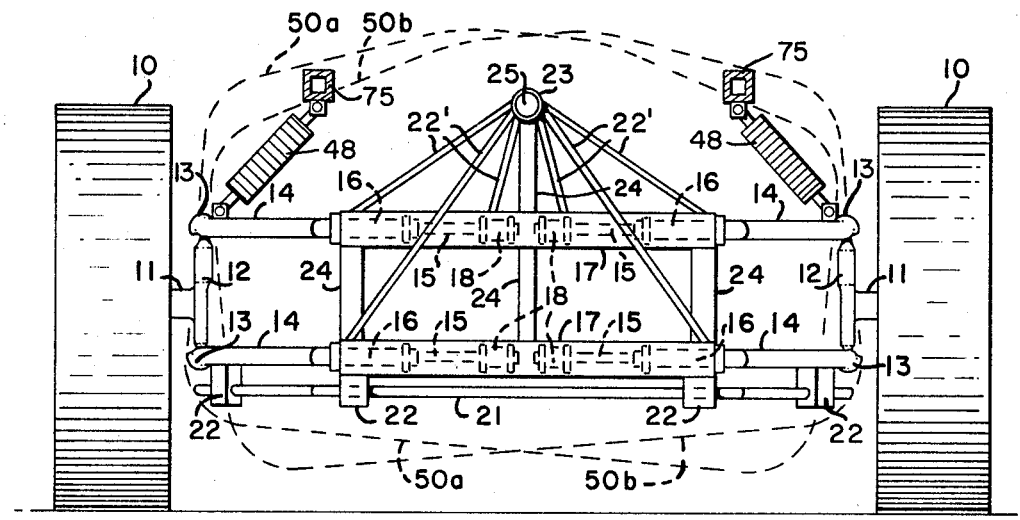
FIGURE 4 is a front view of the wheel suspension system of FIGURE 1 additionally showing, by dashed lines, the outline of two positions of the vehicle chassis.

Referring to the front wheel suspension system, as shown in the lower part of FIGURE 1 and in FIGURES 2 and 4, each of a pair of front wheels 10 is mounted on a spindle 11 (FIG. 2) of a king pin 12 (FIGS. 1 and 2). The king pin 12 supports the tire 10 at a given angle of toe-in and permits the tire to be rotated about a vertical axis by a steering mechanism, to be described subsequently with reference to FIGURES 6 and 7. Such rotation is provided by ball joints 13 between the upper and lower ends of the king pins 12 and the outside ends of a set of trailing links or rods 14 and 15. The inside ends of the trailing links 14 are secured in upper and lower pivot mounts 16 attached, respectively, to upper and lower link mounting bars 17, and the inside ends of the trailing links 15 are secured to pivot mounts 18 also attached to the link mounting bars 17.

As seen in FIGURES 2 and 4, the upper and lower trailing links 14 and 15, which are connected to each king pin 12, are disposed in parallel relation. The pair of trailing links 14 and 15 (FIGS. 1 and 2), which is connected to a single ball joint 13, is formed into a triangular configuration by a bracing rod 19 (FIG. 1). An alignment bar 21 (FIGS. 2 and 4), which is journaled in bearing blocks 22 and attached below the lower trailing links 14 and the trailing link mounting bars 17, serves to maintain the link mounting bars 17 in the horizontal plane parallel to the wheel supporting surface. Thus, each wheel 10 is free to move independently in the vertical plane by the pivoting of the trailing links 14 and 15 for each wheel in the respective pivot mounts 16 and 18.

The link mounting bars 17 are joined by means of strut braces 22′ to a tube 23. Three vertical braces 24 (FIGS. 2 and 4) join the upper and lower mounting bars 17, with the end braces 24 carrying the alignment rod 21 at the bottom ends thereof and the middle brace 24 being attached to the tube 23. A chassis rod member 25 is inserted in the tube 23 to form a pivot joint, and the tube 23 has a surrounding collar 23′ to aid in the support of this pivot joint. The strut braces 22′ aid in supporting this pivot joint and also serve to establish the fore-and-aft or longitudinal positioning of the front wheel suspension. The chassis rod 25 is suitably braced for establishing the transverse or lateral location of the pivot joint at the tube 23.

Figure 3:
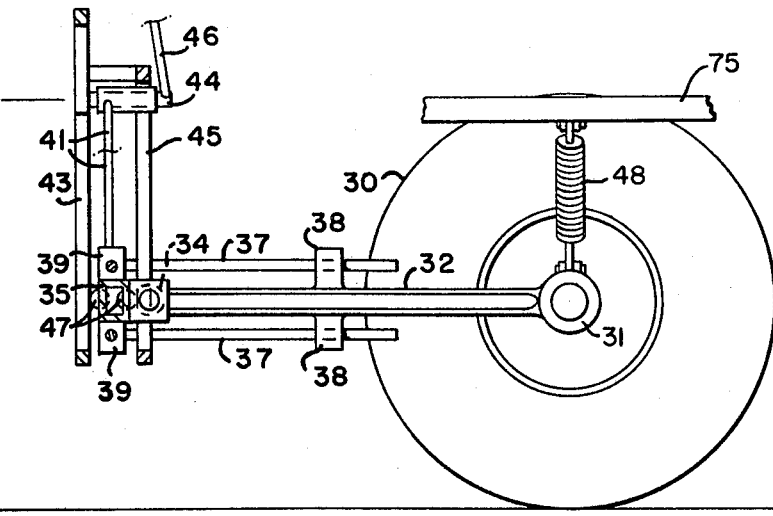
FIGURE 3 is a side elevational view of the rear wheel suspension system taken along line 3—3 of FIGURE 1.
Figure 5:
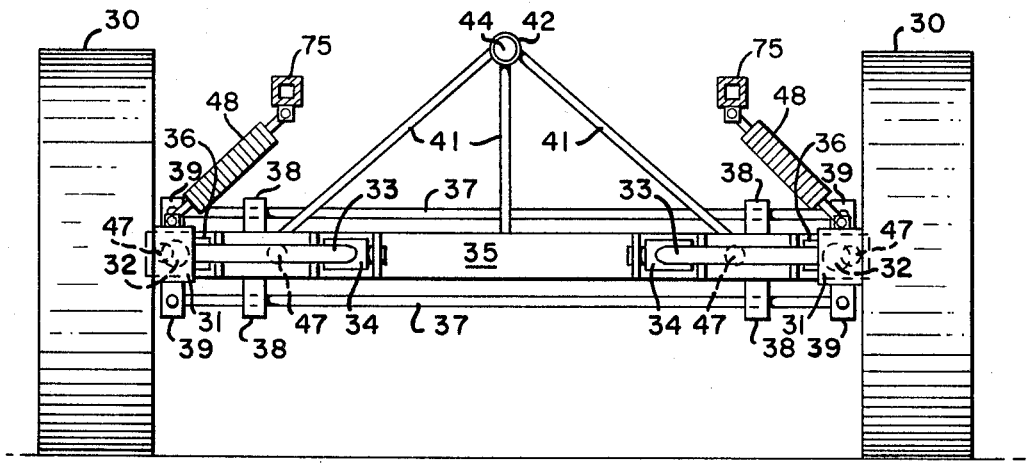
FIGURE 5 is a rear view of the wheel suspension system of FIGURE 1.

Referring to the rear wheel suspension system, as shown in the upper part of FIGURE 1 and in FIGURES 3 and 5, each of a pair of rear wheels 30 is mounted to a stub axle carrier 31 to which is attached the outside ends of angularly joined trailing links or rods 32 and 33. The inside end of each trailing link 32 is secured in a pivot mount 34, which is attached to a link mounting bar 35 (FIG. 3), and the inside end of each trailing link 33 is secured in a pivot mount 36 (FIG. 1), which is also attached to the link mounting bar 35. The angularly joined arrangement of the trailing links 32 and 33 (FIG. 1) on the rear suspension, as well as the angular arrangement of the trailing links 14 and 15 on the front suspension, serves to prevent twisting of these links which could result in wheel misalignment. Upper and lower alignment bars 37 (FIGS. 1 and 3) are journaled in bearing blocks 38 attached to the link mounting bar 35 and in bearing blocks 39 attached to the trailing links 32. The alignment bars 37 thereby serve to maintain the link mounting bar 35 in the horizontal plane parallel to the road so that each wheel 30 is free to move independently in the vertical plane by the pivoting of the trailing links 32 and 33 for each wheel in the respective pivot mounts 34 and 36.

The link mounting bar 35 is joined by means of strut braces 41 to a tube 42 (FIGS. 1 and 3). The fore-and-aft location of the rear suspension system is established by an upright chassis member 43 from which projects an attached rod 44. The rod 44 is inserted into the tube 42 to form a pivot joint with the outer end of the rod 44 being secured in a second upright chassis member 45. The transverse or lateral position of the pivot joint at the tube 42 is established by a pair of bracing struts 46 attached to the chassis rod 44.

The rear suspension system is buffered from the chassis members 43 and 45 by means of a plurality of imbedded balls 47. This permits the chassis to roll smoothly, for example when the vehicle turns a corner. The chassis members 43 and 45, in addition to establishing the fore-and-aft or longitudinal location of the rear suspension system, are able to absorb the driving force of the rear wheels 30.

Conventional springs 48 are provided between the front and rear suspension systems and the vehicle chassis. It should be noted that such springs should not be permitted to load either the front pivot mount 23 or the rear pivot mount 42. For example, coil springs may be mounted between the chassis and the front trailing links 14 and 15, and between the chassis and the rear trailing links 32 and 33.

In operation, all four wheels 10 and 30 are constrained to move in a plane perpendicular to the wheel supporting surface, and yet are free to move independently of each other by the pivoting about a transverse axis of the front trailing links 14 and 15 in the pivot mounts 16 and 18 and by the pivoting about a transverse axis of the rear trailing links 32 and 33 in the rear pivot mounts 34 and 36. Moreover, this operation of the suspension system is unaffected by the roll or lean of the chassis, since any such movement simply results in the pivoting about a longitudinal axis of the front chassis rod 25 in the front pivot mount 23 and the pivoting about a longitudinal axis of the rear chassis rod 44 in the rear pivot mount 42. This is illustrated by the dashed outline of the chassis in FIGURE 4. The chassis rotates from its center position 50a to a tilted position 50b without affecting the suspension system shown by the solid lines. In particular, the chassis can roll or lean without affecting the camber of wheels 10 and 30.

Figure 6:
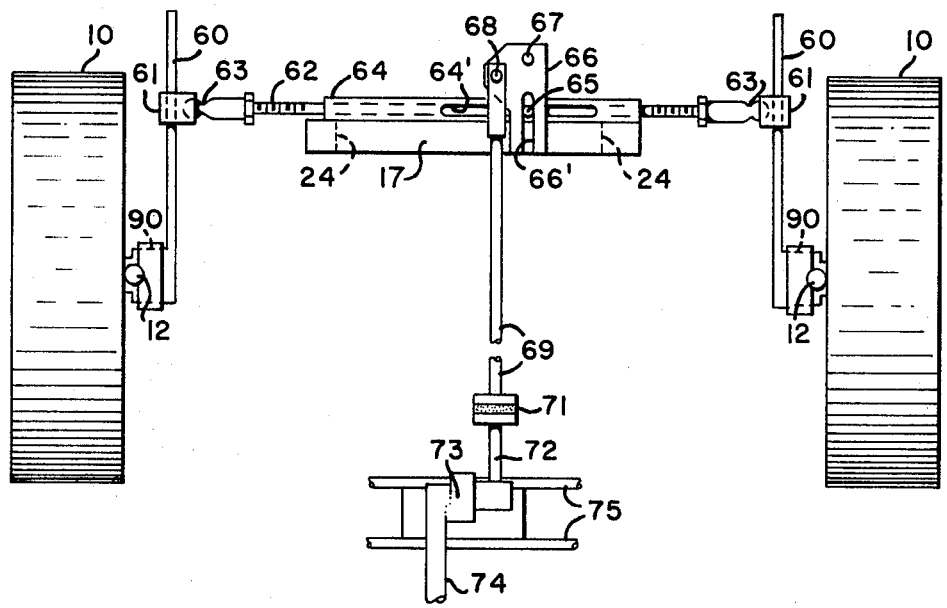
FIGURE 6 is a bottom view of a steering mechanism used in conjunction with the wheel suspension system of FIGURE 1 and embodying the present invention.
Figure 7:
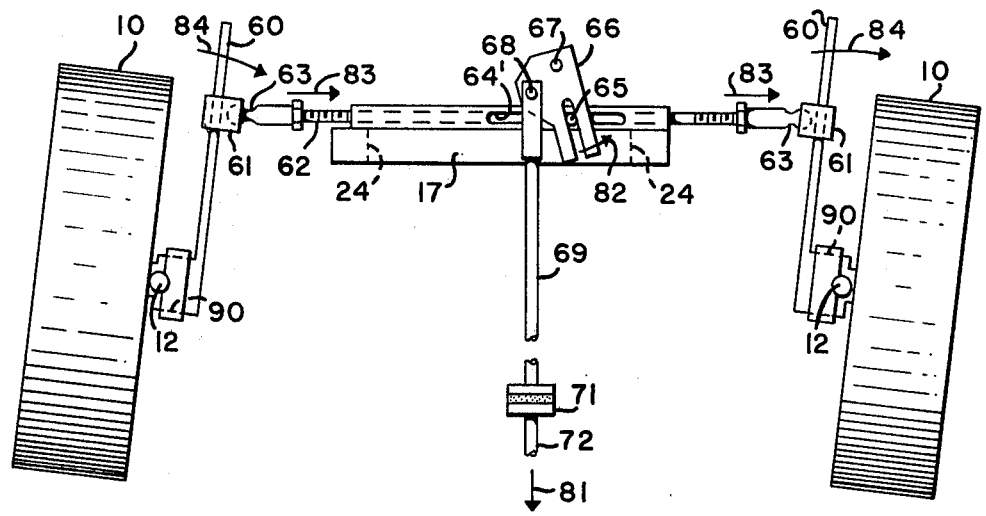
FIGURE 7 is another bottom view of the steering mechanism of FIGURE 6 which illustrates the wheel-turning action of the various members of the mechanism.

The steering machanism for the front wheels 10 is shown in FIGURES 6 and 7. An arm rod 60 is attached to each king pin 12 and extends forward parallel to the vertical plane of the wheel 10 through an arm guide 61. Extending between the arm guides 61 is a one-piece tie rod 62. Threaded to each end of the tie rod 62 is a ball joint 63 which fits into a female connection of the arm guides 61. The tie rod 62 extends through a tube 64, which is mounted between the vertical braces 24 of the front suspension, just below the upper pivot mount 16. For convenience of illustration, the rest of the elements of the front suspension system (FIGURES 1, 2 and 4) are omitted from FIGURES 5 and 6, and, conversely, the parts of the steering mechanism shown in FIGURES 6 and 7 are omitted from FIGURES 1, 2 and 4.

The tube 64 has a slot 64' disposed in the bottom surface thereof and a stud 65 attached to the tie rod 62. The stud 65 extends through the slot 64' in sliding relation therewith. A forked plate 66 is mounted by a hinged connection 67 to the tube 64 with the stud 65 projecting through a slot 66' of the plate 66. Off-set from the line between the stud 65 and the hinge 67 is a second hinged connection 68, which is located between the plate 66 and a steering rod 69. The steering rod 69 is connected via a hinge 71 to the pitman arm or rod 72 that extends from a gear box 73. Connected to the gear box 73 is a standard steering wheel post 74. The gear box 73 is attached to a chassis frame portion 75.

The operation of the steering mechanism can best be described with reference to FIGURE 7. To turn the wheels to the right (as viewed from the bottom of FIG. 7), a rearward thrust in the direction of an arrow 81 on the pitman arm 72 is transmitted via the rod 69 and the hinge 68 to rotate the plate 66 counter-clockwise about the hinge 67, as shown by an arrow 82. This action exerts a lateral force in the direction of arrows 83, which is imparted to the stud 65 of the tie rod 62, thereby moving the stud 65 to the right in the slot 64' (as viewed in FIG. 7) and rotating the king pin arms clockwise about the ball joints 63, as shown by arrows 84, thereby rotating the vertical plane of the wheels 10 clockwise about the king pins 12 (as viewed in FIG. 7). The action for steering to the left is the same, except that the directions of the arrows 81, 82, 83 and 84 are reversed. Any motion in the chassis is transmitted through the frame 75, gear box 73 and pitman arm 72, and is taken up by the rotation of the hinge 71. Thus, such movement of the chassis causes no resistance feedback in the steering and causes no deviation in the toe-in of the front wheels 10. Similarly, movement of the suspension system is taken up by the rotation of the arm 69 about the vertical axis of the hinge 71 so that the wheel alignment and wheel camber is also unaffected by this motion. Movement of the front trailing links and arms 60 are in unison with the arms 60 sliding through the guides 61 and pivoting at the connections 90, which allows the wheels 10 to move up and down in a vertical plane without affecting toe-in. As the arms 60 move up and down, the guides 61 roll therewith to permit uninhibited action by any member of the steering system.

Having thus described my invention, what I claim as new and desire to protect by Letters Patent is:

1. A wheel suspension and steering mechanism for a vehicle comprising: means for supporting a pair of wheels for travel in a predetermined direction along a wheel supporting surface; suspension mounting means aligned substantially parallel with respect to the wheel supporting surface; means including pivot mounts interconnecting said wheel supporting means and said mounting means for permitting independent movement of each of said wheels in a plane perpendicular to the wheel supporting surface; a steering gear box attached to the chassis of said vehicle; means extending from said gear box with a first rod member having a free end adapted to move along a longitudinal path relative to the chassis of the vehicle; a second rod member extending longitudinally relative to the chassis of the vehicle; hinge means interconnecting said first and second rod members for permitting the connected end of said first rod member to move along said longitudinal path in a plane perpendicular to the wheel supporting surface; a tie rod interconnecting said wheels; means responsive to longitudinal movement of said second rod member for imparting transverse motion to said tie rod, thereby turning each of said wheels about an axis perpendicular to the direction of travel; and means for pivotally mounting said suspension mounting means to the chassis of said vehicle to permit said chassis to rotate about the longitudinal axis of said vehicle.

2. A wheel suspension and steering mechanism as claimed in claim 1 wherein said mounting means includes a plurality of bearing blocks, and an alignment rod journalled in said bearing blocks to thereby maintain said mounting means in a plane parallel to said wheel supporting surface.

3. A wheel suspension and steering mechanism for a vehicle comprising: means for supporting a pair of wheels for travel in a predetermined direction along a wheel supporting surface; suspension mounting means aligned substantially parallel with respect to the wheel supporting surface; means including pivot mounts interconnecting said wheel supporting means and said mounting means for permitting independent movement of each of said wheels in a plane perpendicular to the wheel supporting surface; a steering gear box attached to the chassis of said vehicle; means extending from said gear box with a first rod member having a free end adapted for longitudinal movement relative to the chassis of the vehicle; a second rod member extending longitudinally relative to the chassis of the vehicle; hinge means interconnecting said first and second rod members for permitting the connected end of said first rod member to move along a longitudinal path relative to the chassis in a plane perpendicular to the wheel supporting surface; a tie rod interconnecting said wheels; means responsive to longitudinal movement of said rod members for imparting transverse motion to said tie rods, thereby turning each of said wheels about an axis perpendicular to the direction of travel, a tube mounted on said suspension mounting means, said tube surrounding said tie rod and having a transversely extending slot therein and said tie rod having a member projecting through said slot in transversely slidable relationship therewith; and a plate connected in hinged relationship with said second rod member, said plate engaging said projecting member and imparting transverse motion to said tie rod upon longitudinal movement of said rod members.

4. A wheel suspension system for a vehicle comprising: means for supporting a pair of wheels for travel in a predetermined direction along a wheel supporting surface; suspension mounting means aligned substantially parallel with respect to the wheel supporting surface, and means including pivot mounts interconnecting said wheel supporting means and said mounting means for permitting independent movement of each of said wheels in a plane perpendicular to the wheel supporting surface, said suspension mounting means being positioned between upright chassis members in ball bearing relationship therewith.

5. A wheel suspension system as claimed in claim 4 wherein said mounting means includes a plurality of bearing blocks and an alignment rod journalled in said bearing blocks to thereby maintain said mounting means in a plane parallel to said wheel supporting surface.

6. A steering system for a vehicle comprising: means for supporting a pair of wheels for travel in a predetermined direction along a wheel supporting surface; a steering gear box attached to the chassis of said vehicle; means extending from said gear box with a first rod member having a free end adapted for movement in a longitudinal direction relative to the chassis; a second rod member extending longitudinally relative to the chassis; means hingedly interconnecting said first and second rod members for permitting the connected end of said first rod member to move in the longitudinal direction in a plane perpendicular to the wheel supporting surface; a tie rod interconnecting said wheels; means responsive to longitudinal movement of said second rod member for imparting transverse motion to said tie rod, thereby turning each of said wheels about an axis perpendicular to the direction of travel; an arm extending forwardly from each of said wheel supporting means; and ball joint means interconnecting each end of said tie rod to a separate one of said arms for turning said wheels upon transverse motion of said tie rod.

7. A steering system for a vehicle comprising: means for supporting a pair of wheels for travel in a predetermined direction along a wheel supporting surface; a steering gear box attached to the chassis of said vehicle; means extending from said gear box with a first rod member having a free end adapted for movement in a longitudinal direction relative to the chassis of said vehicle; means hingedly interconnecting said first and second rod members for permitting the connected end of said first rod member to move in a plane perpendicular to the wheel supporting surface; a tie rod interconnecting said wheels; means responsive to longitudinal movement of said second rod member for imparting transverse motion to said tie rod, thereby turning each of said wheels about an axis perpendicular to the direction of travel; a tube surrounding said tie rod, said tube having a transversely extending slot therein and said tie rod having a member projecting through said slot in transversely slidable relationship therewith; and a plate connected in hinged relationship with said second rod member, said plate engaging said projecting member and imparting transverse motion to said tie rod upon longitudinal movement of said second rod member.

8. A wheel suspension and steering mechanism for a vehicle comprising: means for supporting a pair of wheels for travel in a predetermined direction along a wheel supporting surface; suspension mounting means aligned substantially parallel with respect to the wheel supporting surface; means including pivot mounts interconnecting said wheel supporting means and said mounting means for permitting independent movement of each of said wheels in a plane perpendicular to the wheel supporting surface; a steering gear box attached to the chassis of said vehicle; means extending from said gear box including a first rod member with a free end adapted for movement along a path longitudinally directed with respect to the chassis of said vehicle; a second rod member extending longitudinally relative to the chassis of said vehicle; hinge means interconnecting said first and second rod members for permitting the connected end of said first rod member to move in the longitudinal path in a plane perpendicular to the wheel supporting surface; a tie rod interconnetcing said wheels; means responsive to longitudinal movement of said first rod member for imparting transverse motion to said tie rod, thereby turning each of said wheels about an axis perpendicular to the direction of travel; and a steering arm pivotally mounted at one end thereof to each of said wheels, each of said steering arms extending forward of said wheels with the other end of each of said steering arms being rotatably inserted in a guide member attached at each end of said tie rod, whereby said movement of each of said wheels in the plane perpendicular to the wheel supporting surface does not affect either the toe-in of the wheels or the turning mechanism for said wheels.

9. A wheel suspension and steering mechanism for a vehicle comprising: means for supporting a pair of wheels for travel in a predetermined direction along a wheel supporting surface; suspension mounting means aligned substantially parallel with respect to the wheel supporting surface; means including pivot mounts interconnecting said wheel supporting means and said mounting means for permitting independent movement of each of said wheels in a plane perpendicular to the wheel supporting surface; a steering gear box attached to the chassis of said vehicle; means extending from said gear box with a first rod member having a free end adapted for longitudinal movement relative to the chassis of the vehicle; a second rod member extending longitudinally relative to the chassis of the vehicle; hinge means interconnecting said first and second rod members for permitting the connected end of said first rod member to move along a longitudinal path relative to the chassis in a plane perpendicular to the wheel supporting surface; a tie rod interconnecting said wheels; means responsive to longitudinal movement of said rod members for imparting transverse motion to said tie rods, thereby turning each of said wheels about an axis perpendicular to the direction of travel, a tube mounted on said suspension mounting means, said tube surrounding said tie rod and having a transversely extending slot therein and said tie rod having a member projecting through said slot in transversely slidable relationship therewith; a plate connected in hinged relationship with said second rod member, said plate engaging said projecting member and imparting transverse motion to said tie rod upon longitudinal movement of said rod members, said mounting means includes a plurality of bearing blocks, and an alignment rod journalled in said bearing blocks to thereby maintain said mounting means in a plane parallel to said wheel supporting surface.

(References on following page)

References Cited

UNITED STATES PATENTS

| | | | |
|---|---|---|---|
| 1,520,598 | 12/1924 | Reynolds | 280—95 |
| 2,073,032 | 3/1937 | Stimson | 280—95 |
| 2,097,445 | 11/1937 | Christman | 280—96.2 |
| 2,210,485 | 8/1940 | Hawkins | 280—104 |
| 2,297,591 | 9/1942 | Urich | 280—96.2 X |
| 2,326,946 | 8/1943 | Huber | 280—95 |
| 2,353,503 | 7/1944 | Rost et al. | 280—112 |
| 2,692,778 | 10/1954 | Stump | 280—112 |
| 3,179,194 | 4/1965 | Hunt | 267—20 |
| 3,261,621 | 7/1966 | Corbin | 280—96.2 |
| 3,269,747 | 8/1966 | Forge | 280—124 |

FOREIGN PATENTS 1,158,381 11/1963 Germany.

KENNETH H. BETTS, Primary Examiner

U.S. Cl. X.R.

280—112